G. PISTOR, J. DION & H. REITZ.
FILTER PRESS.
APPLICATION FILED AUG. 15, 1912.

1,084,659.

Patented Jan. 20, 1914.
3 SHEETS—SHEET 1.

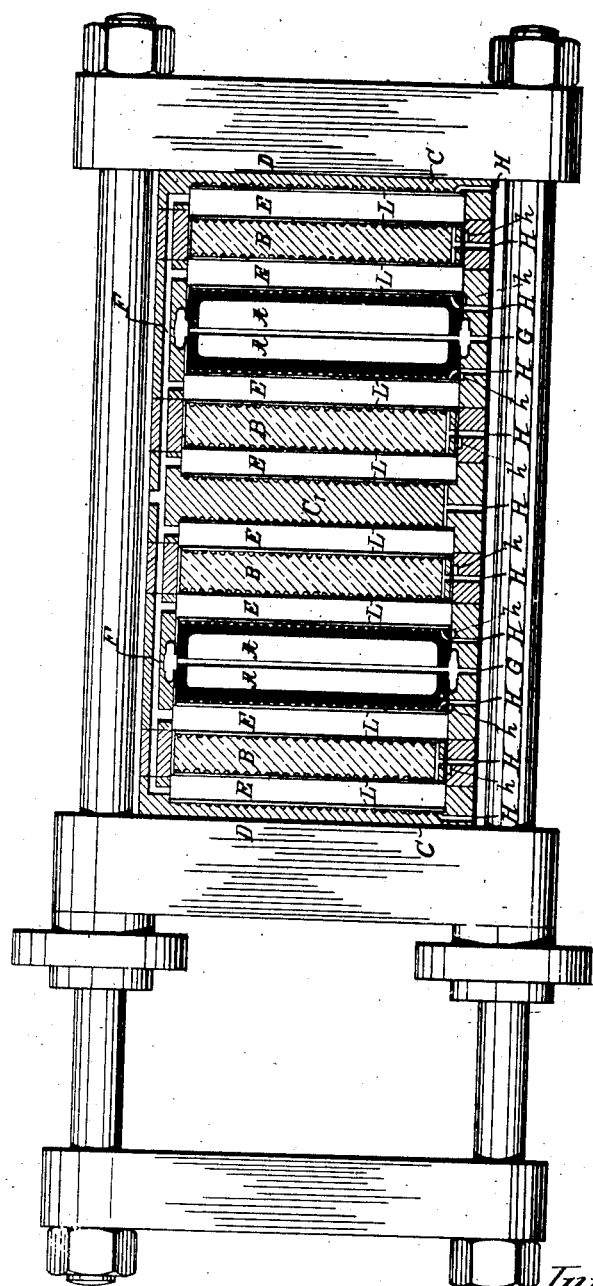

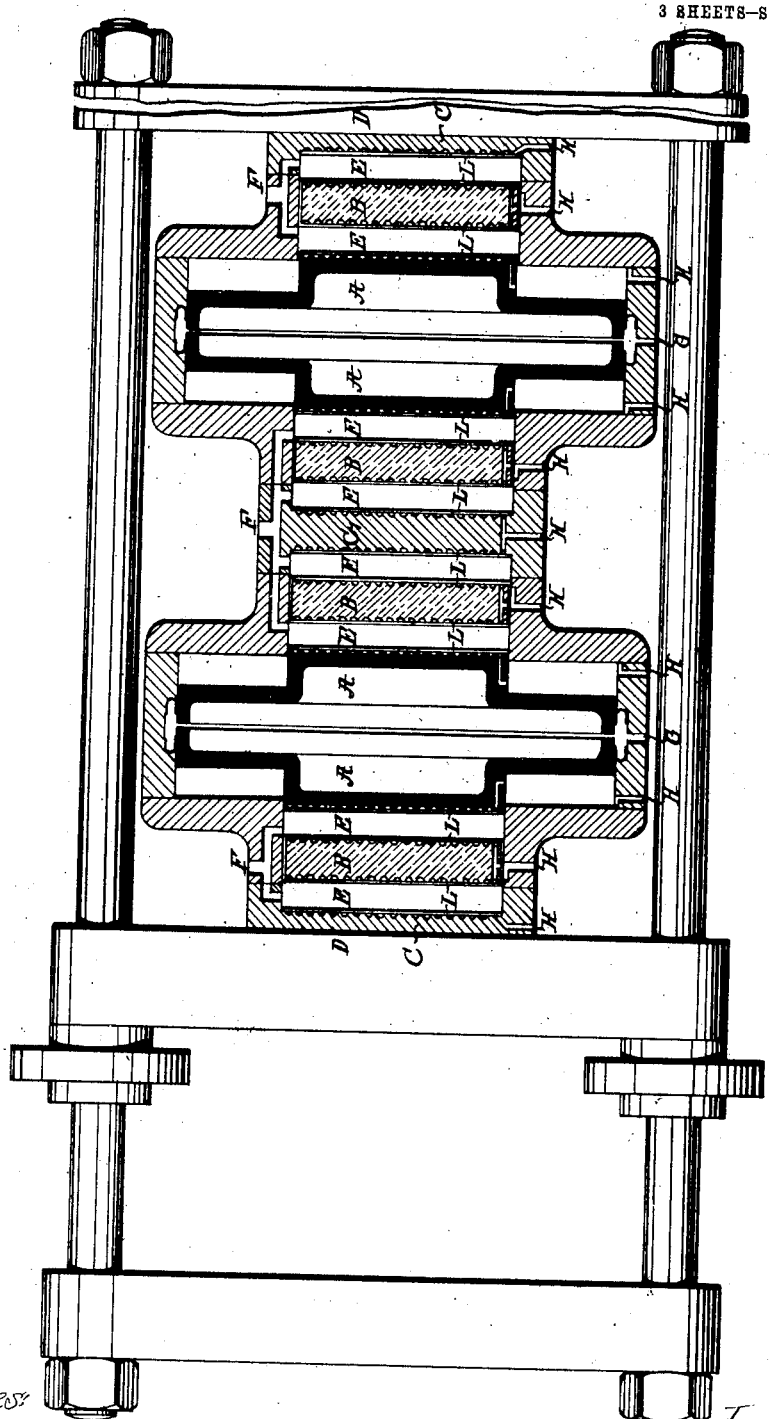

UNITED STATES PATENT OFFICE.

GUSTAV PISTOR, JACOB DION, AND HEINRICH REITZ, OF GRIESHEIM-ON-THE-MAIN, GERMANY, ASSIGNORS TO CHEMISCHE FABRIK-GRIESHEIM-ELEKTRON, OF FRANKFORT-ON-THE-MAIN, GERMANY, A CORPORATION OF GERMANY.

FILTER-PRESS.

1,084,659.  Specification of Letters Patent.  Patented Jan. 20, 1914.

Application filed August 15, 1912. Serial No. 715,309.

*To all whom it may concern:*

Be it known that we, GUSTAV PISTOR, JACOB DION, and HEINRICH REITZ, subjects of the Emperor of Germany, and residents of Griesheim-on-the-Main, Germany, have invented certain new and useful Improvements in Filter-Presses, of which the following is a specification.

In manufactures, and especially in chemical art manufactures, many substances have to be treated in which the liquid and solid portions cannot be sufficiently separated in filter presses, and further treatment in hydraulic presses is necessary. Although there is a mode of working in which the substances are passed first through a filter press and are afterward passed to a hydraulic press to be finished, this is troublesome and costly, and there are up to the present but few constructions which combine the filter press and the hydraulic press. These constructions have however many disadvantages, such for instance as great complication, and consequently limited applicability, or the filtering surface is greatly reduced as compared with an ordinary filter press.

The arrangement in accordance with the present invention provides a combined filter- and hydraulic press, the pressure exerted by which may amount for example to more than 100 atmospheres, of great simplicity, while the filtering area of the ordinary filter presses is not reduced.

According to this invention, hydraulic press cylinders are introduced between members which are formed like the filter-plates of a filter press, the plungers of the said hydraulic press cylinders subjecting the filter cakes to any desired high pressure, and in this way further compressing the filter cakes to a degree in accordance with the hydraulic pressure employed.

We will describe with reference to the accompanying drawings, two constructions of apparatus in accordance with this invention.

Fig. 2 is a similar view illustrating a modifica-
tion;
and Fig. 3 illustrates a further modification.

Fig. 1 illustrates a press of simple construction consisting of two head-pieces D covered with half-filter plates C, two chambers E, and two movable plunger parts A.

Figure 1:
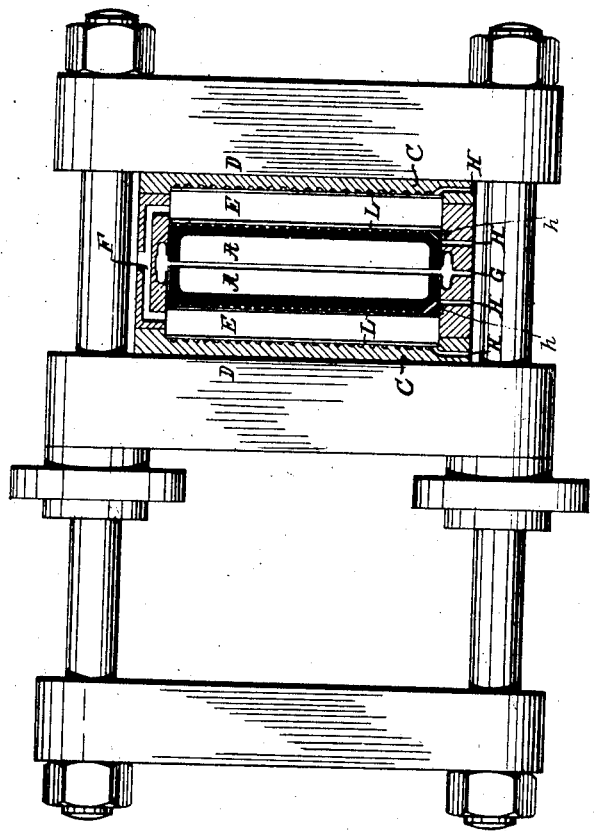
Figure 1 is a view partly in elevation and partly in section of a press constructed in accordance with the present invention.

Fig. 2 shows a modified form. The simple arrangement is doubled or multiplied and fixed intermediate parts $C_1$ provided on each side with filtering surfaces fulfil the function of the corresponding head-pieces D and corresponding half filter plates C. Moreover movable intermediate pieces B provided on both sides with filtering surfaces may be inserted, thereby increasing the number of the active filtering surfaces and the efficiency of the press without it being necessary to increase the number of plunger elements. For the same reason the press plungers may be provided on the side of the filter cakes with filtering surfaces.

In the drawings, the hydraulic cylinders are shown without an intermediate wall so that when water is introduced between the plungers both simultaneously move forward. If desired, however, these hydraulic cylinders can be provided with an intermediate wall for the purpose of driving each plunger forward independently.

The operation is as follows:—The material to be filtered enters through the common filling passage F into the chambers E. When the chambers E are filled, water under pressure is introduced between the plungers A so that they move away from each other and force the liquid through the filtering surfaces L, which may for example be sieves, or cloth, or sieves with cloth. The filtrate runs out through the passage H and the water, through the passages G which during the compressing operations are closed by any suitable means, unless they act at the same time as inlet passages for the water under pressure. Both liquids must of course be collected separately at the outlets of their escape passages (G, H). The outlet passages of the movable intermediate pieces B must be so arranged, relatively to the passages, H, that their connection is not interrupted during the pressing operation by the movement of the intermediate pieces B. In the embodiment of the invention illustrated, this is insured by providing each of the supports for the movable filtering surfaces with a passage leading from the rear of the filter surface thereon to a channel or groove $h$ that extends laterally from the upper end of the adjacent outlet H. The channels $h$ which are formed in the inner face of the lower wall of the inclosing casing are each of such length as to connect the passage H, from which it leads, and the aforesaid passage in the adjacent movable filtering surface support in all positions of the latter, so that each of the passages H is in constant communication with the space in rear of the coöperating filter surface, throughout the movement of the plungers or movable pressure plates. After evacuation, the plungers and intermediate pieces require no special adjustment. On filling they are in the closed press returned to their initial position by the pressure of the material to be filtered and the compression begins afresh.

Fig. 3 shows a press of the same construction as Fig. 2, but in which the pressure area of the hydraulic plunger is greater than the filtering area L. By varying the ratio of the areas, it is possible to increase to any desired amount the specific pressure on the filter cakes even when the pressure of the water remains the same.

We claim:

1. In a filter press the combination of two relatively stationary filter plates, two pressure plates arranged between and movable to and from the filter plates, and hydraulic means for moving the pressure plates apart and toward the filter plates.

2. In a filter press the combination of two relatively stationary filter plates, two additional filter plates arranged between and movable to and from the stationary plates, and means for simultaneously forcing the movable plates in opposite directions toward the stationary plates.

3. In a filter press, the combination of a relatively stationary filter plate, a second filter plate movable to and from the first plate and having a passage extending from the rear of its filtering surface through its lower face, and a casing inclosing said plate and provided with an outlet having a branch extending parallel to the direction of movement of said movable plate and communicating with the aforesaid passage in the movable plate in all positions of the latter.

4. In a filter press the combination of a relatively stationary filter plate, a plunger having its face toward said plate provided with a filtering surface, a movable plate between the plunger and stationary filter plate, having filtering surfaces on both its faces, and a casing surrounding said parts and provided with passages for supplying material to be treated to the spaces between the movable plate and the plunger and stationary plate, respectively, and for receiving liquid passing through all of the filtering surfaces.

5. In a filter press the combination of two relatively stationary filter plates, a hydraulic cylinder arranged between said plates, and plungers movable in said cylinder toward both said plates and provided with filtering surfaces on the faces toward said plates.

6. In a filter press the combination of two relatively stationary filter plates, a hydraulic cylinder arranged between said plates, plungers movable in said cylinder toward both said plates and provided with filtering surfaces on the faces toward said plates, and movable plates having filtering surfaces on both faces arranged between each of said plungers and the adjacent stationary filter plate.

7. In a filter press, the combination of two relatively stationary filter plates, two additional filter plates arranged between the stationary plates, and hydraulic means independent of the material between the stationary and movable plates for moving the latter toward the stationary plates.

8. In a filter press, the combination with two relatively stationary filtering members, of pressing means arranged between said filtering members and comprising two plates, each movable to and from one of said filtering members, and means for admitting liquid under pressure between said plates to increase the distance separating them.

9. In a filter press, the combination of two relatively movable filter plates, an additional plate arranged between and movable relative to both said plates, said intermediate plate having filtering surfaces on both faces, and hydraulic pressure means for effecting relative movement of said plates.

10. In a filter press, the combination of a relatively stationary filter plate, a hydraulic cylinder, a plunger movable in the cylinder to and from said plate and provided with a filtering surface toward said plate and a passage leading from the rear of its filtering surface through its lower face, and a casing inclosing said plate and cylinder and provided with an outlet that is in communication with said passage in the plunger throughout the travel of the latter.

11. In a filter press, the combination of a relatively stationary filter plate, a plate movable to and from said stationary plate and provided with a filter surface toward said stationary plate and a passage leading from the rear of its filtering surface through its lower face, a plate arranged between the said stationary and movable plates and provided with filtering surfaces on both faces and with a passage opening through its lower face and through its body in rear of both filtering surfaces thereon, and a casing inclosing all of said plates and provided with two outlets which are respectively in constant communication with the passages in said movable and intermediate plates.

In testimony whereof we have signed our names to this specification in the presence of two subscribing witnesses.

GUSTAV PISTOR.
JACOB DION.
HEINRICH REITZ.

Witnesses:
 FRANZ HASSLACHER,
 JOSEF WADHOFER.